United States Patent
Fu et al.

(10) Patent No.: US 8,723,837 B1
(45) Date of Patent: May 13, 2014

(54) SCANNING MIRROR TOUCH SCREEN

(75) Inventors: Yee-Chung Fu, Fremont, CA (US); Chen-Chi Lin, San Jose, CA (US)

(73) Assignee: Advanced NuMicro Systems, Inc., San Jose, CA (US)

( * ) Notice: Subject to any disclaimer, the term of this patent is extended or adjusted under 35 U.S.C. 154(b) by 519 days.

(21) Appl. No.: 13/080,044

(22) Filed: Apr. 5, 2011

(51) Int. Cl.
*G09G 5/00* (2006.01)

(52) U.S. Cl.
USPC ........................................ 345/175; 178/18.09

(58) Field of Classification Search
CPC ...... G06F 3/042; G06F 3/0421; G06F 3/0423
USPC ............ 345/173, 175, 176; 178/18.01, 18.09, 178/18.11
See application file for complete search history.

(56) References Cited

U.S. PATENT DOCUMENTS

| | | | | |
|---|---|---|---|---|
| 5,196,835 A | * | 3/1993 | Blue et al. | 345/175 |
| 5,909,210 A | * | 6/1999 | Knox et al. | 345/175 |
| 6,844,539 B2 | * | 1/2005 | Iwamoto et al. | |
| 7,359,041 B2 | * | 4/2008 | Xie et al. | |
| 2010/0277436 A1 | * | 11/2010 | Feng et al. | 345/175 |
| 2011/0141062 A1 | * | 6/2011 | Yu et al. | 345/175 |

* cited by examiner

*Primary Examiner* — Regina Liang
(74) *Attorney, Agent, or Firm* — Chen-Chi Lin; David C Hsia

(57) ABSTRACT

A touch panel system includes a panel, first and second scanning mirrors located about first and second panel corners, a photodetector array along a first panel edge between the first and the second panel corners, and a stationary plane mirror along a second panel edge adjacent to the first panel edge. The first scanning mirror sweeps a light beam across the panel. The second mirror sweeps another light beam across the panel, a part of which reflects from the stationary plane mirror to back into the panel to sweep the panel from a different angle. The light beams, including the reflected part from the stationary plane mirror, strike objects on the panel and reflect towards the photodetector array. Angular positions of the first and the second scanning mirrors at the times the photodetector array detects the reflected light are correlated to object locations.

20 Claims, 4 Drawing Sheets

SCANNING MIRROR TOUCH SCREEN

CROSS REFERENCE TO RELATED APPLICATIONS

This is related to U.S. application Ser. No. 12/164,358, filed Sep. 3, 2010, which is a continuation-in-part of U.S. application Ser. No. 12/727,945, filed Mar. 19, 2010, which claims the benefit of U.S. Provisional Application No. 61/239,680, filed Sep. 3, 2009, and U.S. Provisional Application No. 61/261,270, filed Nov. 13, 2009, which are all incorporated herein by reference.

FIELD OF INVENTION

This invention relates to a touch screen, and more specifically to a touch screen that utilizes micro-electro-mechanical system (MEMS) scanning mirrors.

DESCRIPTION OF RELATED ART

A touch screen display can detect the location of a touch within a display area. The term generally refers to touch or contact to the display of the device by a finger. The touch screen display can also sense other passive objects, such as a stylus. The touch screen display has two main attributes. First, it enables one to interact with what is displayed directly on the screen, where it is displayed, rather than indirectly with a mouse or touchpad. Secondly, it lets one do so without requiring any intermediate device, again, such as a stylus that needs to be held in the hand. Such displays can be attached to computers or, as terminals, to networks. They also play a prominent role in the design of digital appliances such as satellite navigation devices, mobile phones, and video games.

SUMMARY

In one or more embodiments of the present disclosure, a touch screen system includes a panel, first and second scanning mirrors located about first and second panel corners, a photodetector array along a first panel edge between the first and the second panel corners, and a stationary plane mirror along a second panel edge adjacent to the first panel edge. The first scanning mirror sweeps a light beam across the panel. The second mirror sweeps another light beam across the panel, at least a part of which reflects from the stationary plane mirror back into the panel to sweep the panel from a different angle. The light beams, including the reflected part from the stationary plane mirror, strike objects on the panel and reflect towards the photodetector array. Angular positions of the first and the second scanning mirrors at the times the photodetector array detects the reflected light are correlated to object locations.

BRIEF DESCRIPTION OF THE DRAWINGS

In the drawings.

Use of the same reference numbers in different figures indicates similar or identical elements.

DETAILED DESCRIPTION OF THE INVENTION

Figure 1:
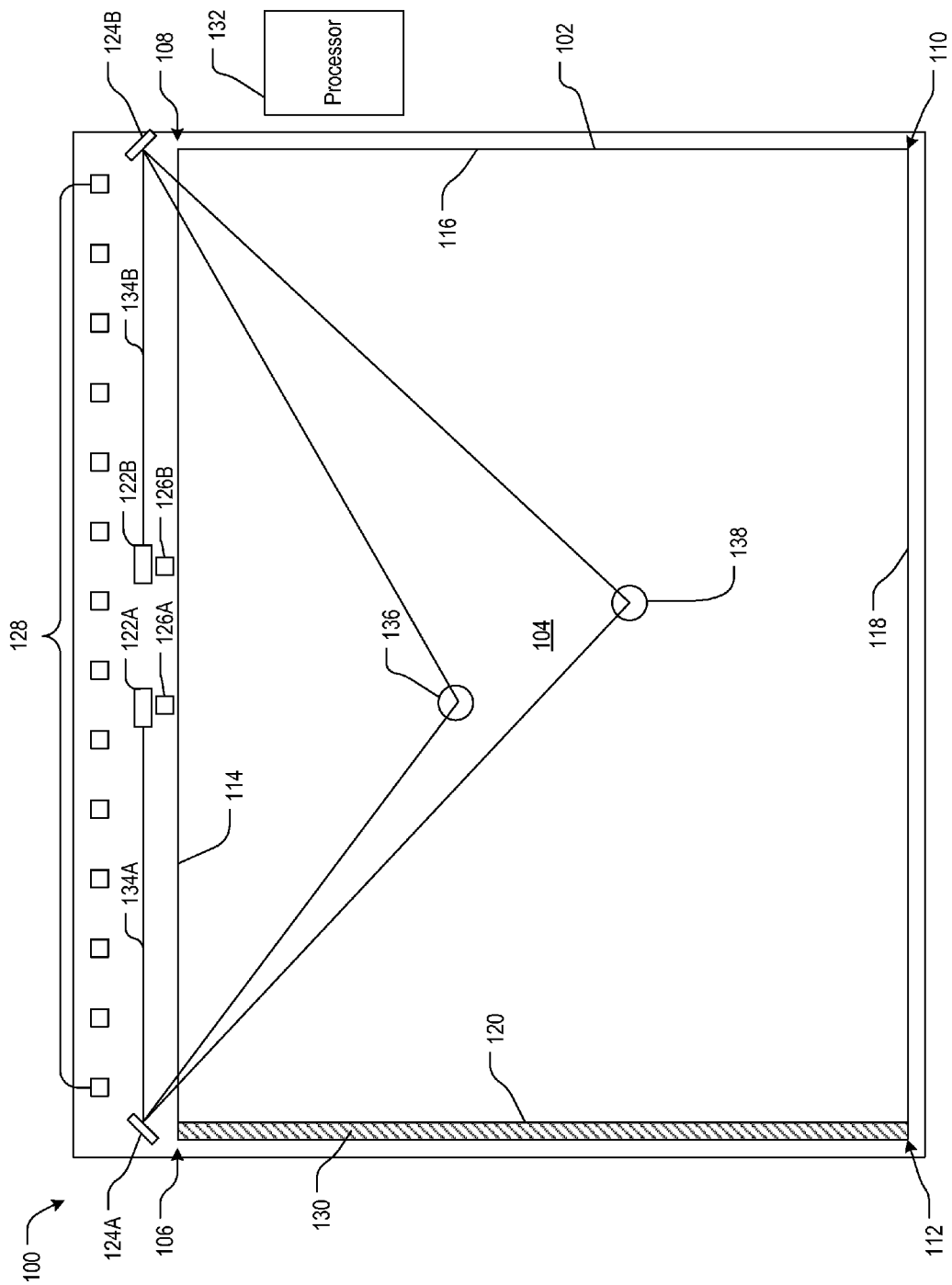
FIG. 1 illustrates a top view of a touch screen system utilizing micro-electro-mechanical system (MEMS) scanning mirrors in one or more embodiments of the present disclosure.

FIG. 1 illustrates a top view of a touch screen system 100 for a panel 102 in one or more embodiments of the present disclosure. Panel 102 has a panel surface 104, four corners 106, 108, 110, and 112, and four edges 114, 116, 118, and 120. Panel 102 may be a display panel or a projection screen for a projection display system.

Touch screen system 100 includes touch sensor components placed around panel 102. The touch sensor components include emitters 122A and 122B, MEMS scanning mirrors 124A and 124B, reference photodetectors 126A and 126B, a photodetector array 128, and a stationary plane mirror 130. In one embodiment, these touch sensor components are mounted on a bezel 103 for panel 102. In another embodiment, these touch sensor components are mounted directly on panel 102. The touch sensor components may include a processor 132 for determining locations of objects on or proximate to panel surface 104.

Emitter 122A emits a light beam 134A that impinges MEMS scanning mirror 124A located about panel corner 106. MEMS scanning mirror 124A periodically sweeps light beam 134A across panel surface 104. MEMS scanning mirror 124A mechanically rotates about ±22.5 degrees, which generates an optical scan angle of about ±45 degrees for 90 degrees of coverage. The optical scan angle provides a first sweep over panel surface 104 from the position of MEMS scanning mirror 124A about panel corner 106.

MEMS scanning mirror 124A periodically reflects light beam 134A onto reference photodetector 126A, which generates a reference signal indicative of the oscillation period of the MEMS scanning mirror. Any object in the path of light beam 134A would reflect the light beam toward photodetector array 128, which generates a detection signal indicative of the location of the object. Photodetector array 128 is aligned along panel edge 114 between screen corners 106 and 108. The photodetectors in array 128 are coupled in parallel and they have their lateral sensor surfaces facing into panel 102 to collect reflected light and generate detection signals.

Emitter 122B emits a light beam 134B that impinges MEMS scanning mirror 124B located about panel corner 108. MEMS scanning mirror 124B periodically sweeps light beam 134B across panel surface 104. MEMS scanning mirror 124B mechanically rotates about ±22.5 degrees, which generates an optical scan angle of about ±45 degrees for 90 degrees of coverage. The optical scan angle provides a second sweep over panel surface 104 from the position of MEMS scanning mirror 124B about panel corner 108.

MEMS scanning mirror 124B periodically reflects light beam 134B onto reference photodetector 126B, which generates a reference signal indicative of the oscillation period of the MEMS scanning mirror. Any object in the path of light beam 134B would reflect the light beam toward photodetector array 128, which generates a detection signal indicative of the location of the object.

To determine the location of one object or "touch," processor 132 compares the two detection signals from photodetector array 128 against corresponding reference signals from reference photodetectors 126A and 126B in the time domain to determine the angular positions of MEMS scanning mirrors 124A and 124B. Once the angular positions of MEMS scanning mirrors 124A and 124B at the moment of touch are determined, processor 132 uses triangulation to determine the location of the object.

As MEMS scanning mirrors 124A and 124B share photodetector array 128, the two detection signals must be differentiated for the MEMS scanning mirrors. In one method, the emitter for one MEMS scanning mirror is turned on while the emitter for the other MEMS scanning mirror is turned off and vice versa. In another method, the MEMS scanning mirrors have different scanning periods. The correspondence between the detection signals and their respective MEMS scanning mirrors is then determined based on the periodic pattern of the detection signals.

When two objects 136 and 138 are on or proximate to panel surface 104, additional information is needed to resolve the ambiguity generated by the simultaneous touches as there are two solutions based on four angular positions of MEMS scanning mirrors 124A and 124B. Stationary plane mirror 130 is provided to resolve this ambiguity.

Figure 2:
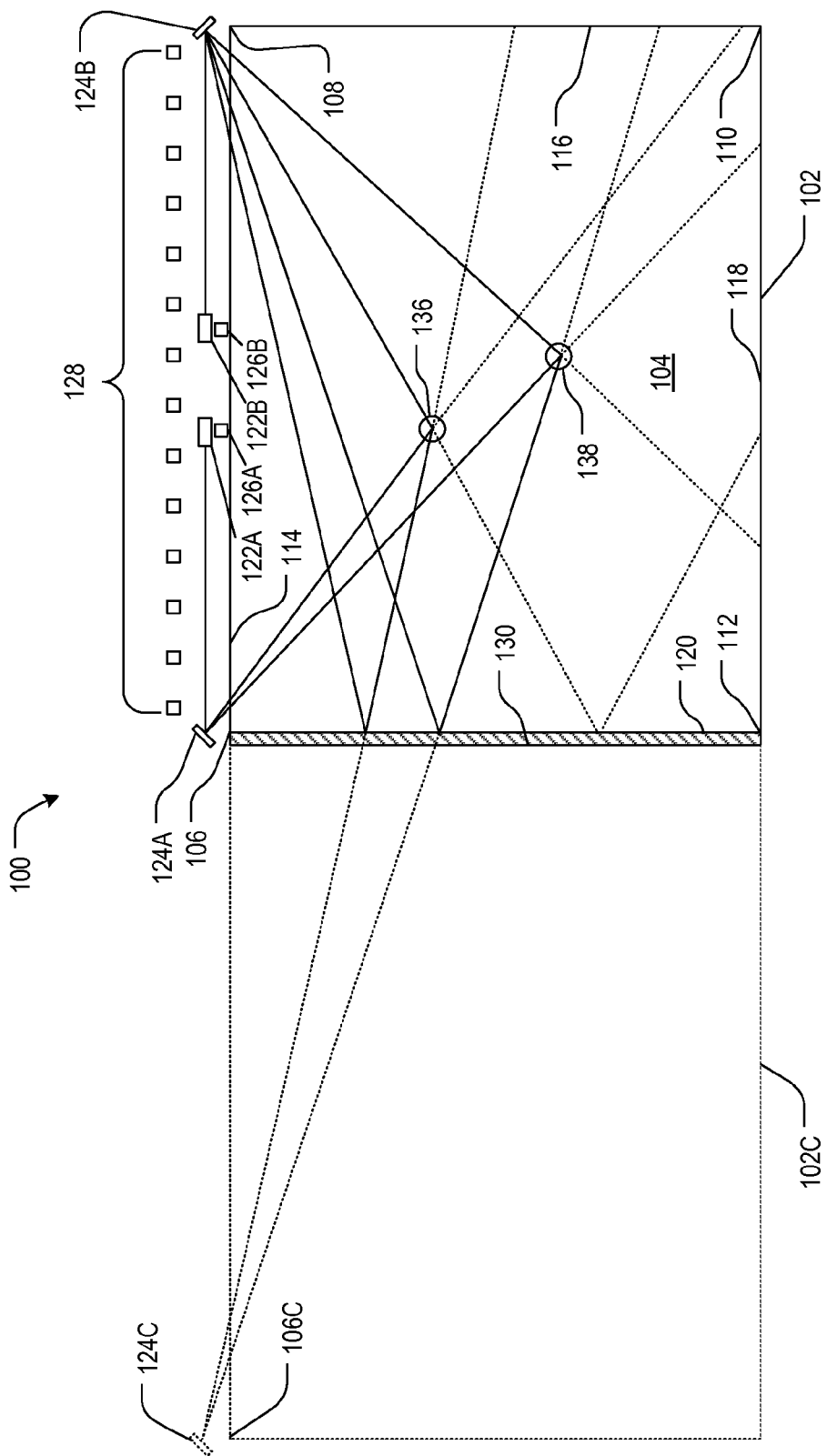
FIG. 2 illustrates a top view of the touch screen system of FIG. 1 with a virtual MEMS scanning mirror in one or more embodiments of the present disclosure.

As shown in FIG. 2, MEMS scanning mirror 124B sweeps light beam 134B over panel surface 104. At least a portion of the second sweep reaches panel edge 120 between panel corners 106 and 112 and reflects from stationary plane mirror 130 at the panel edge back into panel 102. Stationary plane mirror 130 creates a third sweep over panel surface 104 from the position of a virtual MEMS scanning mirror 124C located about a panel corner 106C of a virtual panel 102C. Any object in the path of light beam 134B in this third sweep would reflect the light beam toward photodetector array 128, which generates a detection signal indicative of the location of the object.

Figure 3:
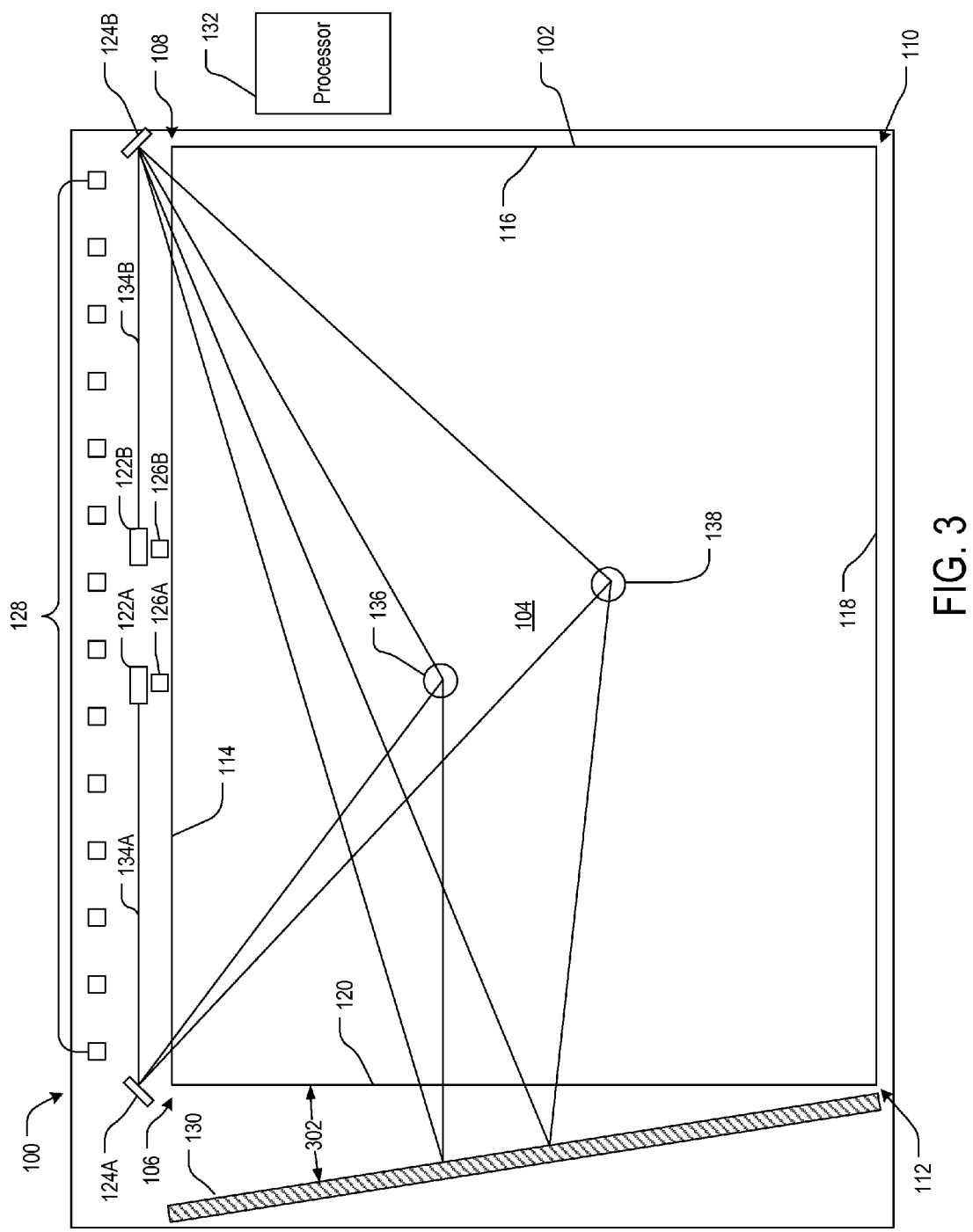
FIG. 3 illustrates a top view of a touch screen system in one or more embodiments of the present disclosure.

In one embodiment, stationary plane mirror 130 is substantially parallel to panel edge 120. In another embodiment illustrated in FIG. 3, stationary plane mirror 130 is angled relative to panel edge 120. Stationary plane mirror 130 may be pivoted about third panel corner 112 away from panel edge 120. The angle 302 between stationary plane mirror 130 and panel edge 120 may be between 1 to 10 degrees. By angling stationary plane mirror 130, certain blind spots in the third sweep over surface panel 104 may be avoided.

Processor 132 determines angular positions of MEMS scanning mirror 124A, MEMES scanning mirror 124B, and virtual MEMS scanning mirror 124C at the moment of touch by comparing the detection signals from photodetector array 128 against corresponding reference signals from reference photodetectors 126A and 126B in the time domain. Referring back to FIG. 2, processor 132 then determines the intersections of the angular positions where an object is located at an intersection of three angular positions.

Figure 4:
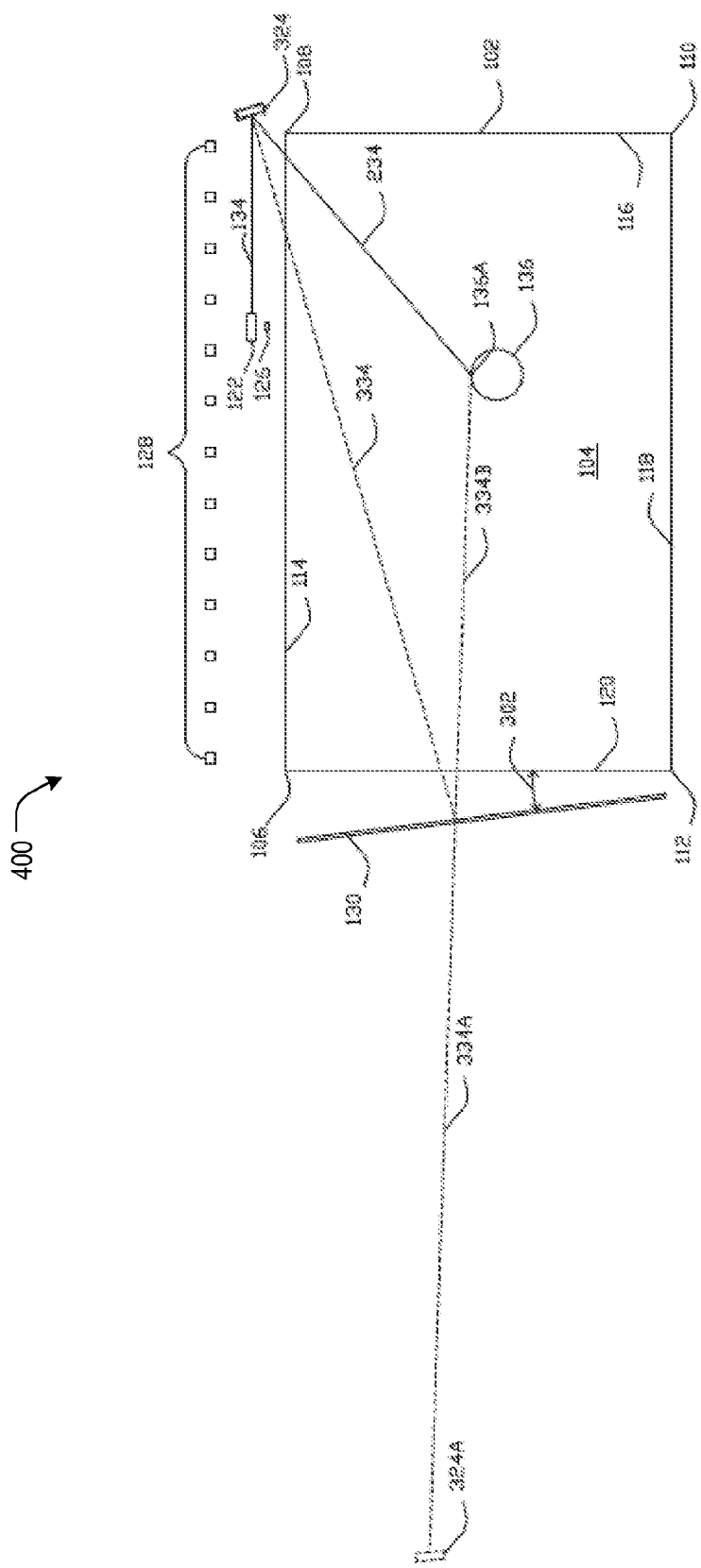
FIG. 4 illustrates a top view of a touch screen system utilizing a MEMS scanning mirror in one or more embodiments of the present disclosure.

FIG. 4 illustrates a top view of a touch screen system 400 for a panel 102 in one or more embodiments of the present disclosure. System 400 is system 100 in a single MEMS scanning mirror configuration.

An emitter 122 emits a light beam 134 that impinges MEMS scanning mirror 324 located about panel corner 108. MEMS scanning mirror 324 periodically sweeps light beam 134 across panel surface 104 and onto reference photodetector 126, which generates a reference signal indicative of the oscillation period of the MEMS scanning mirror. An object in the path of light beam 134 would reflect the light beam toward photodetector array 128, which generates a detection signal indicative of the location of the object. For example, a sweep 234 of light beam 134 strikes point 136A on object 136 and reflects toward photodetector array 128.

At least a portion of the sweep reflects from stationary plane mirror 130 back into panel 102. Stationary plane mirror 130 creates an additional sweep over panel surface 104 from the position of a virtual MEMS scanning mirror 324A. An object in the path of light beam 134 in this additional sweep would also reflect the light beam toward photodetector array 128, which generates a detection signal indicative of the location of the object. For example, a sweep 334 of light beam 134 reflects from stationary plane mirror 130 to become a sweep 334B, which strikes point 136A on object 136 and reflects toward photodetector array 128. Note that sweep 334B is an extension of a sweep 334A from virtual MEMS scanning mirror 324A.

To determine the location of a touch, processor 132 (FIG. 1 or 3) determines angular positions of MEMS scanning mirror 324 and virtual MEMS scanning mirror 324A at the moment of touch by comparing the detection signals from photodetector array 128 against corresponding reference signal from reference photodetector 126 in the time domain. Once the angular positions of MEMS scanning mirrors 324 and virtual MEMS scanning mirror 324A at the moment of touch are determined, processor 132 uses triangulation to determine the location of the object.

Various other adaptations and combinations of features of the embodiments disclosed are within the scope of the invention. Numerous embodiments are encompassed by the following claims.

The invention claimed is:

1. A touch screen system for a panel comprising a panel surface, a first panel corner, a second panel corner adjacent to the first panel corner, a first panel edge between the first and the second panel corners, and a second panel edge adjacent to the first panel edge, the touch screen system comprising:
   a MEMS scanning mirror located about the first panel corner, the MEMS scanning mirror reflecting a beam to create a first beam sweep over the panel surface;
   a stationary plane mirror located generally along the second panel edge, the stationary plane mirror reflecting at least part of the first beam sweep back into the panel to form a second beam sweep over the panel surface;
   a photodetector array along the first panel edge, the photodetector array detecting light from the first and the second beam sweeps reflected from one or more objects proximate to or touching the panel surface and generating detection signals;
   a reference photodetector receiving the beam reflected from the MEMS scanning mirror, the reference photodetector generating a reference signal in response to the beam; and
   a processor being programmed to:
      determine angular positions of the MEMS scanning mirror and a virtual MEMS scanning mirror created by the stationary plane mirror from the detection signals and the reference signal; and
      determine an intersection of the angular positions, wherein an object is located at the intersection of the angular positions.

2. The touch screen system of claim 1, wherein the stationary plane mirror is pivoted 1 to 10 degrees away from the second panel edge about a third panel corner at an end of the second panel edge opposite of the second panel corner.

3. The touch screen system of claim 1, wherein the stationary plane mirror is substantially parallel to the second panel edge.

4. The touch screen system of claim 1, wherein photodetectors in the photodetector array are coupled in parallel to the processor.

5. The touch screen system of claim 1, further comprising a bezel for the panel, wherein the MEMS scanning mirror, the stationary plane mirror, and the photodetector array are located on the bezel.

6. The touch screen system of claim 1, wherein the panel is a display panel or a projection screen.

7. A touch screen system for a panel comprising a panel surface, a first panel corner, a second panel corner adjacent to the first panel corner, a first panel edge between the first and the second panel corners, and a second panel edge adjacent to the first panel edge, the touch screen system comprising:
- a first MEMS scanning mirror located about the first panel corner, the first MEMS scanning mirror reflecting a first beam to create a first beam sweep over the panel surface;
- a stationary plane mirror located generally along the second panel edge, the stationary plane mirror reflecting at least part of the first beam sweep back into the panel to form a second beam sweep over the panel surface;
- a second MEMS scanning mirror located about the second panel corner, the second MEMS scanning mirror reflecting a second beam to create a third beam sweep over the panel surface;
- a photodetector array along the first panel edge, the photodetector array detecting light from the first, the second, and the third beam sweeps reflected from one or more objects proximate to or touching the panel surface and generating detection signals;
- a first reference photodetector receiving the first beam reflected from the first MEMS scanning mirror, the first reference photodetector generating a first reference signal in response to the first beam;
- a second reference photodetector receiving the second beam reflected from the second MEMS scanning mirror, the second reference photodetector generating a second reference signal in response to the second beam; and
- a processor being programmed to:
  - determine angular positions of the first MEMS scanning mirror, the second MEMS scanning mirror, and a virtual MEMS scanning mirror created by the stationary plane mirror from the detection signals and the first and the second reference signals; and
  - determine intersections of the angular positions, wherein an object is located at an intersection of three angular positions.

8. The touch screen system of claim 7, wherein the stationary plane mirror is pivoted 1 to 10 degrees away from the second panel edge about a third panel corner at an end of the second panel edge opposite of the second panel corner.

9. The touch screen system of claim 7, wherein the stationary plane mirror is substantially parallel to the second panel edge.

10. The touch screen system of claim 7, wherein photodetectors in the photodetector array are coupled in parallel to the processor.

11. The touch screen system of claim 7, further comprising a bezel for the panel, wherein the first MEMS scanning mirror, the second MEMS scanning mirror, the stationary plane mirror, and the photodetector array are located on the bezel.

12. The touch screen system of claim 7, wherein the panel is a display panel or a projection screen.

13. A method for providing a touch screen system for a panel with a panel surface, a first panel corner, a second panel corner adjacent to the first panel corner, a first panel edge between the first and the second panel corners, and a second panel edge adjacent to the first panel edge, the method comprising:
- reflecting, using a MEMS scanning mirror about the first panel corner, a beam to create a first beam sweep over the panel surface;
- reflecting, using a stationary plane mirror generally along the second panel edge, at least part of the first beam sweep back into the panel to create a second beam sweep over the panel surface;
- detecting, using a photodetector array along the first panel edge, light from the first and the second beam sweeps reflected from one or more objects proximate to or touching the panel surface and generating detection signals;
- receiving, using a reference photodetector, the beam reflected from the MEMS scanning mirror and generating a reference signal in response to the beam; and
- determining, using a processor, one or more locations of the one or more objects, comprising:
  - determining angular positions of the MEMS scanning mirror and a virtual MEMS scanning mirror created by the stationary plane mirror from the detection signals and the reference signal; and
  - determining an intersection of the angular positions, wherein an object is located at the intersection of the angular positions.

14. The method of claim 13, wherein the stationary plane mirror is pivoted 1 to 10 degrees away from the second panel edge about a third panel corner at an end of the second panel edge opposite of the second panel corner.

15. The method of claim 13, wherein the stationary plane mirror is substantially parallel to the second panel edge.

16. The method of claim 13, wherein photodetectors in the photodetector array are coupled in parallel to provide a single output signal.

17. A method for providing a touch screen system for a panel with a panel surface, a first panel corner, a second panel corner adjacent to the first panel corner, a first panel edge between the first and the second panel corners, and a second panel edge adjacent to the first panel edge, the method comprising:
- reflecting, using a first MEMS scanning mirror about the first panel corner, a first beam to create a first beam sweep over the panel surface;
- reflecting, using a stationary plane mirror generally along the second panel edge, at least part of the first beam sweep back into the panel to create a second beam sweep over the panel surface;
- reflecting, using a second MEMS scanning mirror about the second panel corner, a second beam to create a third beam sweep over the panel surface;
- detecting, using a photodetector array along the first panel edge, light from the first, the second, and the third beam sweeps reflected from one or more objects proximate to or touching the panel surface and generating detection signals;
- receiving, using a first reference photodetector, the first beam reflected from the first MEMS scanning mirror and generating a first reference signal in response to the first beam;
- receiving, using a second reference photodetector, the second beam reflected from the second MEMS scanning mirror and generating a second reference signal in response to the second beam; and
- determining, using a processor, one or more locations of the one or more objects, comprising:
  - determining angular positions of the first MEMS scanning mirror, the second MEMS scanning mirror, and a virtual MEMS scanning mirror created by the stationary plane mirror from the detection signals and the first and the second reference signals; and determining intersections of the angular positions, wherein an object is located at the intersection of three angular positions.

18. The method of claim 17, wherein the stationary plane mirror is pivoted 1 to 10 degrees away from the second panel edge about a third panel corner at an end of the second panel edge opposite of the second panel corner.

19. The method of claim 17, wherein the stationary plane mirror is substantially parallel to the second panel edge.

20. The method of claim 17, wherein photodetectors in the photodetector array are coupled in parallel to provide a single output signal.

* * * * *